(12) United States Patent
Cole et al.

(10) Patent No.: US 12,295,491 B2
(45) Date of Patent: May 13, 2025

(54) SHELF SUPPORT

(71) Applicant: Nominal Sum Limited, Colchester (GB)

(72) Inventors: Simon John Homes Cole, Essex (GB); Dev Bhupatrai Raval, London (GB)

(*) Notice: Subject to any disclaimer, the term of this patent is extended or adjusted under 35 U.S.C. 154(b) by 152 days.

(21) Appl. No.: 17/892,231

(22) Filed: Aug. 22, 2022

(65) Prior Publication Data
US 2023/0062542 A1 Mar. 2, 2023

(51) Int. Cl.
A47B 96/02 (2006.01)
A47B 96/06 (2006.01)
E04C 3/02 (2006.01)

(52) U.S. Cl.
CPC ............... A47B 96/06 (2013.01); E04C 3/02 (2013.01)

(58) Field of Classification Search
CPC ......... E04C 3/02; A47B 96/02; A47B 96/021; A47B 96/024; A47B 96/06; A47B 96/061; A47B 96/066; F16B 7/0446; F16B 7/0473; F16B 12/32
USPC ............ 52/636, 317; 248/57, 200.1; 108/42; 211/87.9, 88.02, 90.01, 90.02, 135
See application file for complete search history.

(56) References Cited

U.S. PATENT DOCUMENTS

| | | | | |
|---|---|---|---|---|
| 2,849,123 A * | 8/1958 | Magill | ................... | A47B 45/00 108/42 |
| 4,285,610 A * | 8/1981 | Rusch | ................... | F16B 7/0446 403/189 |
| 4,955,490 A * | 9/1990 | Schafer | ................... | A47B 96/02 211/187 |
| 5,239,790 A * | 8/1993 | Fetzer | ................... | A47B 96/025 52/90.1 |
| 5,297,886 A * | 3/1994 | Jansen | ................... | F16B 7/0413 403/302 |
| 5,406,895 A * | 4/1995 | Suess | ................... | A47B 96/021 211/153 |
| 6,705,056 B2 * | 3/2004 | Tollenaar | ............... | E04B 2/7457 52/696 |
| 7,331,296 B1 * | 2/2008 | Wood | ..................... | A47B 96/02 108/42 |
| 2001/0004432 A1 * | 6/2001 | Pfister | ................... | F16M 13/022 403/188 |

(Continued)

FOREIGN PATENT DOCUMENTS

| | | | | |
|---|---|---|---|---|
| GB | 2364347 A | * | 1/2002 | ............ F16B 12/32 |
| SE | 8903557 A | * | 4/1991 | |

(Continued)

OTHER PUBLICATIONS

GB Intellectual Property Office, Search Report under section 17, Feb. 14, 2022, GB2112167.8.

*Primary Examiner* — Ryan D Kwiecinski
(74) *Attorney, Agent, or Firm* — Invention To Patent Services; Alex Hobson

(57) ABSTRACT

A shelf support, especially for loft shelving, comprises an elongate member intended to support a shelf, the member having a respective socket at each of two mutually opposite ends, and two mounting brackets each comprising two spaced-apart arms and each insertable into a respective one of the sockets to be positionable therein with the arms projecting away from the member in the length direction of the member so as to provide securing projections for embracing and securing to a respective mount on which the support is to be mounted.

12 Claims, 2 Drawing Sheets

(56) References Cited

U.S. PATENT DOCUMENTS

| | | | | |
|---|---|---|---|---|
| 2002/0023391 | A1* | 2/2002 | Nymark | E04B 2/7453 |
| | | | | 211/94.01 |
| 2002/0038533 | A1* | 4/2002 | Potter | E04C 3/065 |
| | | | | 52/634 |
| 2005/0045787 | A1* | 3/2005 | Magnusson | A47B 96/024 |
| | | | | 248/250 |
| 2005/0144865 | A1* | 7/2005 | Ellingson | E06B 1/70 |
| | | | | 52/272 |
| 2013/0056433 | A1* | 3/2013 | Von De Linde | A47B 96/07 |
| | | | | 211/134 |
| 2015/0164224 | A1* | 6/2015 | Kemp | A47B 5/02 |
| | | | | 108/42 |

FOREIGN PATENT DOCUMENTS

| | | | | |
|---|---|---|---|---|
| SE | 8903557 L | | 4/1991 | |
| SE | 525406 C2 * | | 2/2005 | A47B 1/00 |

* cited by examiner

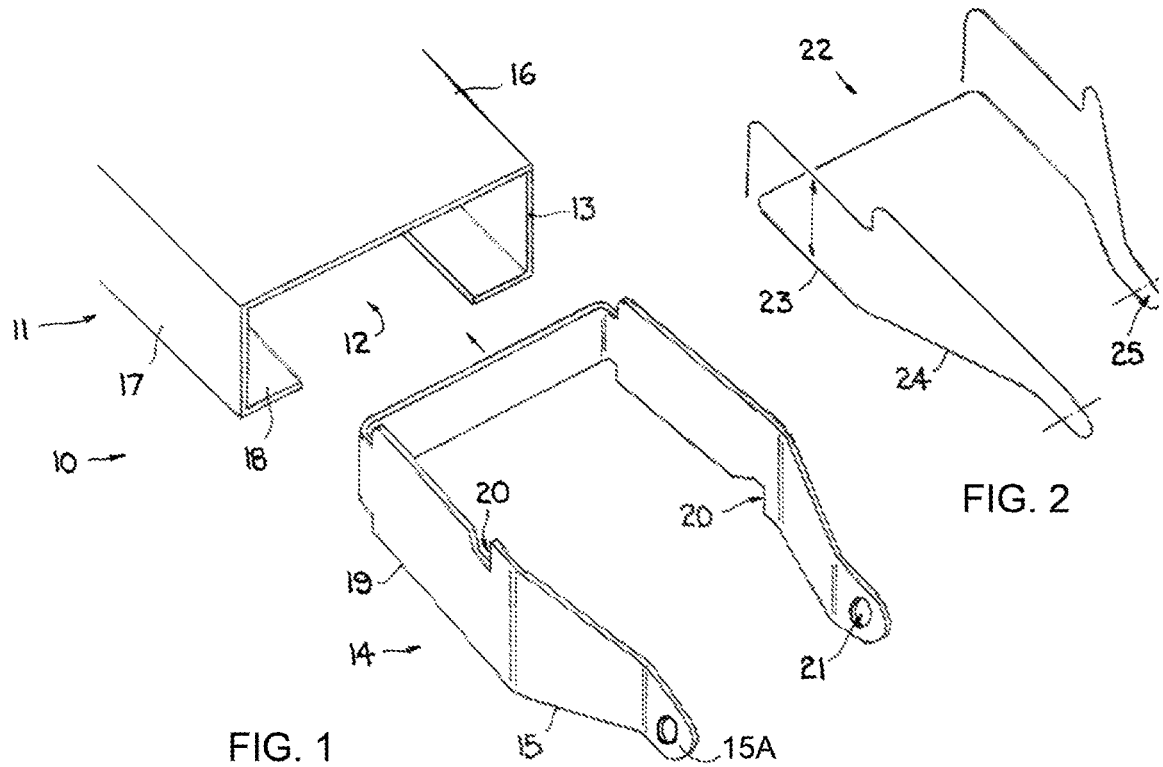
FIG. 1
FIG. 2
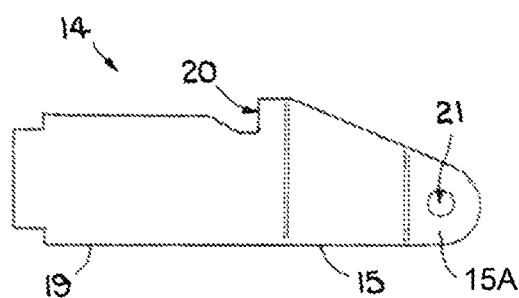
FIG. 3
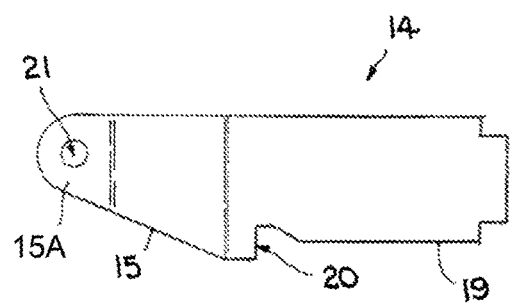
FIG. 4
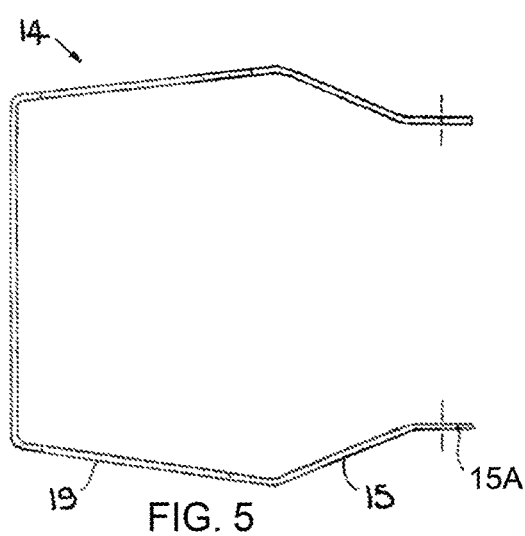
FIG. 5
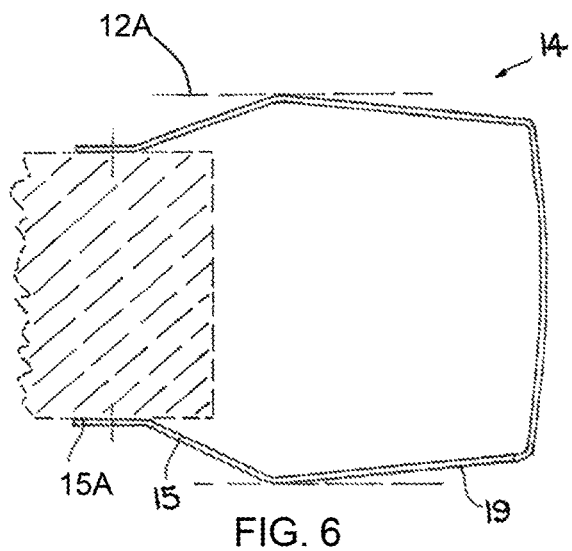
FIG. 6

SHELF SUPPORT

CROSS REFERENCE TO RELATED APPLICATIONS

This application claims the benefit of priority to GB2112167.8, filed on Aug. 25, 2021; the entirety of which is hereby incorporated by reference herein.

BACKGROUND OF THE INVENTION

Field of the Invention

The present invention relates to a shelf support, especially a support usable for shelving in an area with a structure of struts or posts, such as in a loft or attic.

Background

Shelving, if not free-standing, is generally wall mounted and in that case supported by projecting wall brackets. In other locations where walls are not present, shelving is usually supported by ad hoc blocks or brackets adapted to the circumstances. In the case of lofts where there may be no walls, but various struts providing bracing between, typically, floor joists and roof rafters or chords, supports can be attached to the struts to enable shelving to be fitted at desired locations. Such supports are usually pieces of timber of selected cross-sectional size and cut to length to bridge a gap between confronting struts to which the timber lengths are secured, such as by nails or screws. Shelves can then be laid on the supports formed by the secured timber lengths. This can be a laborious task if shelving is to be erected in a larger area requiring multiple supports and inconvenient in confined spaces such as lofts.

SUMMARY OF THE INVENTION

It is therefore the principal object of the present invention to provide a shelf support which is simple to fit and particularly suited to fitting in lofts and other areas where advantage can be taken of struts, posts and similar generally upwardly oriented structural elements able to serve as mounts for the support.

A further object of the invention is to provide a shelf support which can be readily adapted to accommodate different spacings of mounts and as such can be part of a universal shelving system.

Other objects and advantages of the invention will be apparent from the following description.

According to a first aspect of the present invention there is provided an elongate member intended to support a shelf, the member having two mutually opposite ends and defining a respective socket at each of the ends, and two mounting brackets each comprising two spaced-apart arms and each insertable into a respective one of the sockets to be positionable therein with the arms projecting away from the member in a direction of prolongation thereof so as to provide mutually spaced securing projections intended to receive therebetween and thereby embrace a mount on which the support is to be mounted, the projections being securable to such a mount when embraced by the projections so as to attach the member to the mount for mounting of the support and a supported shelf.

A shelf support embodying the present invention represents a ready-to-use component which is simple to fit and capable of providing a rigid and strong load-bearing point for a shelf and the items it may carry. It is only necessary to insert the brackets into the sockets of the elongate member, optionally after reducing the member to a desired length, and then locate the resulting unit in a desired position between two mounts such as upwardly directed struts or posts, with the projections formed by the arms of each bracket positioned to embrace the relevant strut or post. The support can then be secured to the struts or posts by the arms so as to fix the support in place, after which a shelf can be placed on the support in conjunction with other supports in a number and positions depending on the shelf length. In a case where the support is fitted to typical roof truss struts converging in a downward direction, the ends of the elongate member can rest on the struts so that load is transferred directly to the struts rather than via the brackets, which provides a particularly sturdy shelf underpinning with enhanced load-bearing capability and avoidance of loading solely in shear. In situ construction of shelf supports from timber or other arbitrarily selected materials is eliminated and supports embodying the present invention can be marketed in a small range with dimensional differences of the elongate member and brackets, such as elongate member length and bracket arm spacing, to accommodate different spacings and thicknesses of struts.

For preference, the brackets when positioned in the sockets are retained therein by pressurable engagement with the member, so that the support when assembled forms a unit which can handled without the constituent parts separating. However, the pressurable engagement may be such that separation is possible through the application of sufficient force to withdraw the brackets from the sockets. If so desired, however, the elongate member and brackets can interact in such a way that the inserted brackets permanently locate in the sockets, for example through the provision of detents, barbs or latching means resisting withdrawal. In a bracket construction advantageous from the aspect of retention in the associated socket, each of the brackets may comprise a positioning part which is positionable in a respective one of the sockets and from which the arms of the bracket extend, the positioning part being dimensioned to be an interference fit in the socket. The positioning part can thus be inserted to a desired depth in the socket, so as to permit, on the one hand, adaptation of the overall length of the assembly of elongate member and brackets to smaller differences in spacing of mounts from one support to another in a situation with multiple supports for a shelf and to maintain, on the other hand, firm location of the brackets in the sockets by virtue of the interference fit of the bracket positioning parts.

In that case the bracket construction is preferably such that the positioning part of each bracket is resiliently deflectable to provide the pressurable engagement. The resilient deflection provides location of the positioning part by spring force alone, which then allows subsequent separation of the brackets and elongate member, should this be required, simply by exertion of enough force in a bracket withdrawal direction to overcome the spring force. In a convenient construction, each of the brackets is substantially U-shaped and the positioning part is formed by a base of the U and resiliently deflectable adjoining first portions of arms of the U, the arms of the bracket then being formed by distal second portions of the arms of the U. Such a U-shape is simple to produce and economical in terms of material consumption, yet allows scope for formation of the positioning part in a size and configuration sufficient to ensure firm location in the respective socket. A capability of resilient deflection of the first portions of the arms of the U may be advantageously achieved if those portions in an uninserted state of the bracket are splayed apart in a direction away from the base of the U to have a maximum spacing greater than a corresponding wall spacing of the respective socket and are resiliently bendable to adapt to the socket wall spacing. Consequently, when the bracket is inserted into the socket the first portions of the arms of the U are squeezed together by co-operating walls of the socket and pressurably engage those walls to hold the bracket in the socket. The described U-shaped configuration of the bracket is particularly amenable to an integral bracket construction, in which case each of the brackets may be made of folded sheet metal. The bracket can then be conveniently produced by producing a sheet metal blank of desired outline, inclusive of any integrated features as mentioned further below, and folding the blank into the desired U-shape.

In an alternative configuration of the U-shaped bracket each of the first portions of the arms of the U in an uninserted state of the bracket has a width greater than a corresponding width of the respective socket and is compressible to adapt to the socket width. Pressurable engagement of each bracket with the elongate member is thus achieved by reducing a dimension of each of the first portions of the arms of the U rather than the spacing of the two first portions from one another. Such a bracket configuration can be realised in simple manner if each of the brackets is made of wire, although a sheet metal construction is also possible.

In a preferred embodiment each of the brackets comprises a stop for limiting the depth of insertion of each bracket into the respective socket, so that the securing projections formed by the arms of the inserted bracket can be of a consistent length. For preference, the stop of each bracket is formed by a respective abutment adjoining each arm of that bracket and engageable with an end face of an entry opening of the respective socket. The abutments can thus be integrated features formed by, for example, suitable shaping of the material of the bracket, for example a profile of the afore-mentioned sheet metal blank. In order to enhance the security of the inserted bracket and resist any tendency to tilt when the abutments are bearing against the end face of the entry opening of the socket the abutments are preferably each engageable with the end face at a respective one of two mutually opposite sides of the entry opening.

Securing of the arms of a bracket to a mount may be facilitated if each of the arms of each bracket is provided with an opening for reception of a securing device, such as a screw, for securing the arm to the mount. In that case, the openings in the arms of each bracket are preferably offset so that securing devices received therein do not collide. With respect to fitting of the brackets to mounts the offset can be vertical, horizontal or at any angle therebetween.

In a preferred construction of the elongate member its sockets are defined by end portions of a continuous cavity of the member, which means that the member can be conveniently cut to length without any impact on the sockets, i.e. the sockets are simply formed by end portions of the residual cavity of the shortened member. The member preferably has a minimalist construction, for example a construction characterised by a substantially inverted U-shaped cross-section in which the base of the U is intended to support the shelf and the arms of the U are provided at their distal ends with flanges directed towards one another, each of the sockets being bounded by the base, arms and flanges of the cross-section. This shape can be readily created by making the member from folded sheet metal in similar manner to the brackets. Other constructions of the member are equally possible, for example a member with a hollow box cross-section. This, too, can be produced from folded sheet metal.

In a second aspect the invention provides a mounted shelf assembly, comprising a shelf support according to the first aspect of the invention, the brackets of the support being inserted into and retained in the sockets of the elongate member of the support, a respective mount embraced by and secured by the arms of each of the brackets, and a shelf supported by the elongate member. The mounts of the mounted assembly can be, for example, elements of a roof truss, in which case the shelf support can be part of a system providing shelving in a loft or similar roof space. In an advantageous application, the mounts are struts of a roof truss, the struts converging towards one another in a direction away from a crest of the truss and the elongate member of the shelf support resting on the struts in a level setting with respect to an intended use orientation of the truss. In this assembly, the weight of a shelf and of any items the shelf carries is transmitted directly by the member to the struts on which it rests so as to largely relieve the arms of the brackets of load or at least reduce the loading of the arms.

BRIEF DESCRIPTION OF SEVERAL VIEWS OF THE DRAWINGS

A preferred embodiment of the shelf support will now be more particularly described with reference to the accompanying drawings, in which:

FIG. 1 is a perspective view of a shelf support embodying the invention, showing an end portion of an elongate member of the support and one of two brackets, which are insertable into respective sockets of the member, of the support;

FIG. 2 is a schematic perspective view, to a smaller scale, of an alternative form of the bracket;

FIG. 3 is a view of the bracket of FIG. 1 from one side;

FIG. 4 is a view of the bracket of FIG. 1 from the other side;

FIG. 5 is a plan view of the bracket of FIG. 1, showing the configuration of the bracket in an uninserted state;

FIG. 6 is a plan view of the bracket of FIG. 1, showing the configuration of the bracket in an inserted state;

DETAILED DESCRIPTION OF THE ILLUSTRATED EMBODIMENTS

Figure 7:
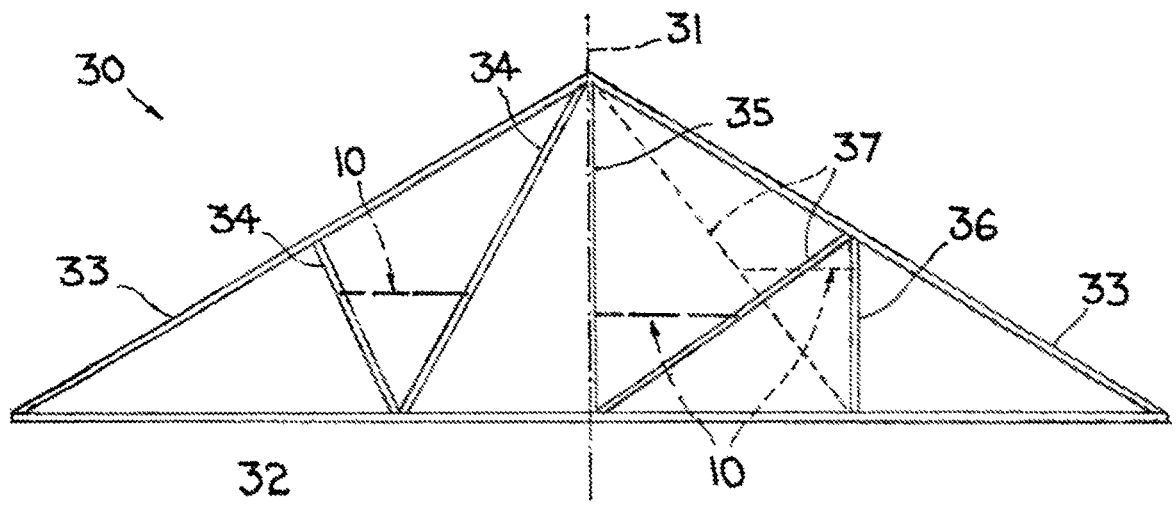
FIG. 7 is a schematic elevation of a roof truss with different constructions of the lefthand and righthand halves, each half being fitted with a shelf support according to FIG. 1.

Referring now to the drawings there is shown a shelf support 10 for use, normally in conjunction with one or more further such supports, in creating shelving where advantage can be taken of existing mounts in the form of posts, struts, braces and other uprights or upwardly directed elements of a structure, especially in the roof enclosure or loft of a building, but also in any other suitable, normally indoor, area. The support 10 comprises an elongate member 11, which is intended to support a shelf (see FIG. 8) at one side and has a respective socket 12 at each of two opposite ends of the member, an entry opening of each socket being bounded by an end face 13 of the member, and two mounting brackets 14 each insertable into a respective one of the sockets and comprising two spaced-apart arms 15 which, when the bracket is positioned in its socket, project from the member 11 in a direction of prolongation thereof so as to provide securing projections for embracing and securing to a mount of the kind described.

A particular feature is that the brackets 14 when positioned in the sockets 12 are kept in place by pressurable engagement with the elongate member, especially walls of the sockets, so that the combination of member 11 and inserted brackets 14 forms a unit which can be handled and fitted without separation of the parts. In that case, mechanically positive coupling of the member 11 and brackets 14 is not needed, but remains possible as an alternative or additional feature. However, a particular advantage of pressurable interengagement or an interference fit of the member 11 and each bracket 14 based on sliding insertion of the brackets into the sockets 12 is the facility for adjustment of the position of the brackets in the sockets to accommodate tolerances in mounting, including repositioning of brackets for height adjustment of the support 10 in relation to the level of another such support for the same shelf or for greater extension of a bracket from its socket to clear an unsatisfactory securing point and reach an acceptable point. In that case, absence of a mechanically positive coupling, for example a screw or other fastener, simplifies adjustment. A additional non-positive coupling, for example by a clamping screw, can nevertheless be helpful to provide additional location of a bracket 14 in its socket 12 while being easily releasable and retightenable to provide location in an default bracket position and then a final, adjusted position.

In the described and illustrated embodiment the elongate member 11 has a substantially inverted—as seen in a use orientation—U-shaped cross-section in which the base 16 of the U is intended at an outer side to support a shelf and the flanks or arms 17 of the U are provided at their distal, i.e. free, ends with returns in the form of flanges 18 directed towards one another to provide a partial side parallel with the base 16. The member 11 accordingly has a continuous cavity, end portions of which define the two sockets 12, the sockets being of sufficient depth to ensure firm location of the brackets 14 therein and being partly open at the partial side by virtue of the gap between the flanges 18. This represents a simple and economically producible design of the member 11 with the significant advantage that the member can be readily cut to length depending on requirements. The same result may be achieved, with the penalty of greater weight and material consumption, by a hollow box section. However, since the sockets 12 are required only at the ends of the member, there is no constraint on the form the member may take in the region between the ends other than the need to be sufficiently load-bearing to support the shelf and any articles it may bear. Accordingly, the member could be solid in most or all of that region if penalties in relation to lightness and economy of construction are accepted. In the case of the preferred embodiment, with an inverted U-shaped cross-section and the described accompanying advantages, manufacture from folded sheet metal of relatively small thickness of about a millimetre is both simple and economic, yet results in a lightweight and load-bearing structure.

Each mounting bracket 14, which here is made in similar manner to the elongate member 11 from folded sheet metal of the same or similar thickness, comprises a positioning part 19 which is positionable in a selectable one of the sockets 12 and from which the arms 15 extend, the positioning part being dimensioned to provide the interference fit in the socket. Whilst this could be achieved by, for example, a simple wedging effect, the positioning part 19 in the case of the described embodiment is constructed to be resiliently deflectable or yielding in order to provide the pressurable engagement. This offers the advantage of allowing some variation in the extent of reception of the bracket 14 in its socket 12 without affecting the pressurable engagement. Each of the brackets 14 has a generally U-shaped configuration in which the positioning part 19 is formed by the base of the U and resiliently deflectable adjoining first portions of the arms of the U, the actual arms 15 of the bracket 14 then being formed by distal second portions of the arms of the U, thus continuations of the first portions. The arms of the U thus function in part as an element of the positioning part 19, in particular an element imparting a capability of resilient deflection, and in part as the bracket arms 15 forming the securing projections when the bracket is inserted into its socket 12. As can be seen in, especially, FIGS. 1 and 5, the first portions of the arms of the U, thus the portions forming part of the positioning part 19, are splayed apart in a direction away from the base of the U when the bracket 14 is not inserted in the socket 12. The splay is such that the first portions of the arms of the U have a maximum spacing greater than the corresponding spacing of boundary walls of the socket 12, specifically the boundary walls formed by the arms 17 of the inverted U section of the elongate member 11. On insertion of the positioning part 19 of the bracket 14 into a selected one of the sockets 12 the first portions of the arms of the U of that part are resiliently bent towards one another to pressurably bear against the socket boundary walls and generate friction resisting separation of the bracket and member. However, the friction is of such a low level as not to impede the bracket insertion or, if desired, bracket movement in a withdrawal direction for positional adjustment in the socket 12 or even complete removal.

The inserted state of the positioning part 19, with the first portions of the arms of the U of that part deflected towards one another and bearing against the socket boundary walls, is shown in FIG. 6. The walls are here schematically represented by dashed lines 12A. As also evident from FIG. 6, deflection or bending of the arms of the U of the positioning part 19 can take place entirely or in part through bending of the base of the U into a slightly curved bow. In the illustrated embodiment, bending preferentially takes place in the base of the U through dimensioning of the base, which acts as a connecting strap, to be of smaller width than the first portions of the arms of the U, so that these portions are intrinsically stiffer.

When the brackets 14, in particular the positioning parts 19 thereof, are positioned in the sockets 12 the arms 15 of each bracket extend from the associated socket (cf. FIGS. 8 and 9) and form securing projections able to embrace a mount, as schematically shown in FIG. 6. As can be seen, the arms 15 are angled towards one another at fold lines close to the junction with the positioning part 19 and then realigned at further fold lines to define approximately parallel securing tabs 15a for resting against and securing to a mount. The spacing of the arms 15 at their free ends, in particular the region of the tabs 15A, is selected to approximately correspond with a corresponding dimension of a given form of mount, for example a standard timber thickness in the case of a support 10 intended to be secured to struts in a loft. The spacing of the tabs 15A can be adjusted to larger differences in mount dimensions by simply bending the arms towards or away from one another at the fold lines. If the support 10 is to be used with a range of standard timber thicknesses, different brackets with preset greater or lesser spacings of the securing tabs can be supplied to obviate the need for adjustment.

Although the positioning parts 19 of the brackets 14 can be pushed into the sockets 12 to a variable depth, the maximum depth of insertion is limited in the case of the illustrated bracket by a stop, which is provided by an abutment 20 integrally formed on each arm 15 and engageable with the end face 13 at the entry opening of the respective socket 12. The abutments 20 of the two arms 15 of an individual bracket 14 are disposed at opposite sides of the bracket so as to engage the end face 13 at two opposite sides of the socket entry opening. As can be seen in FIGS. 1, 3 and 4, the abutments 20 are formed simply by appropriate profiling of the arms 15.

To facilitate securing of the projections formed by the arms 15 to a mount, each of the arms is provided, in particular in the securing tab 15a, with an opening 21 for reception of a screw, bolt, nail or other securing device which can be inserted through the opening and, if a screw, screwed into the mount, for example the wood of a timber strut or post. Collision of the securing devices is prevented by an offset of the openings 21, in the case of the bracket of FIGS. 1, 3 and 4 an offset in vertical direction with respect to the intended orientation of the support 10 when installed. With a view to material saving, the arms 15 of each bracket are asymmetric in the sense of having outline shapes inverted relative to one another (cf., especially, FIGS. 3 and 4), so that the arms have no greater depth than necessary for the task of embracing and securing to the mount.

Although construction of each bracket 15 from folded sheet metal and with the features outlined above is preferred from the aspects of ease and cost of manufacture, other forms of construction are possible. In that connection FIG. 2 shows, merely by way of example, an alternative form of bracket 22 which is also basically U-shaped with a positioning part 23 and two spaced-apart arms 24 analogous to the positioning part 19 and arms 15 of the bracket 14, but which is made from bent wire and has variant features. The wire is represented by a single line, but can typically have a diameter of about 4 millimetres. In this example, resilient deflection of the positioning part 23 of the bracket 22 is provided not by bending of the first portions of the arms of the U towards one another under engagement with the flanks or arms 17 of the U of the elongate member 11, but by compression of each of those first portions under engagement with the base 16 of the U of the member and with a respective one of the flanges 18. For that purpose, each of the first portions of the arms of the U of the positioning part 23 in the uninserted state of the bracket 22 has a width greater than the corresponding width of the socket 12, that is to say the clear spacing of the flanges 18 from the base 16, so that the first portion of each arm compresses when inserted into one of the sockets 12. The direction of compression and also that of relaxation are indicated by a double arrow in FIG. 2. The rigidity of the wire of the bracket 22 is such that bending of the wire within any given length is limited, but the wire structure can additionally bend at, especially, returns formed at the free ends of the arms 24 of the bracket as a consequence of the length of lever arm between the returns and the base of the U of the positioning part 23.

As a further difference, the arms 24 of the bracket 22 are of different length so that openings 25, which are defined simply by loops in the wire at the above-mentioned returns, for securing devices are offset in horizontal direction with respect to the intended orientation of the support 10 when installed. Collision of the securing devices is thus prevented in similar manner to the bracket 14 of FIGS. 1, 3 and 4. It will be evident that with suitable adaptation of shape the vertical spacing of the securing device openings 21 of the bracket 14 could be employed in the bracket 22 and, conversely, the horizontal spacing of the securing device openings 25 of the bracket 22 could be employed in the bracket 14.

Although pressurable engagement of the positioning part 19 or 23 of the bracket 14 or 22 in a socket 12 by way of resilient yielding is preferred, if the positioning part were to be retained in the socket by a fastener or other mechanically positive or even non-positive (friction) coupling it could be of different design such as a box section, a solid, a skeletal structure or any other configuration that allows the positioning part to sit firmly and substantially free of play in the socket. Alternative constructions of the positioning part may, however, lose the advantages of economy and simplicity by comparison with the illustrated and described preferred form of U-shaped bracket in which the arms 15 of the bracket 14 or 22 are an integral extension of a positioning part of basic construction with a minimised need for material.

Installation of the shelf support 10, in particular a mounted shelf assembly, is shown by way of example in FIG. 7, the assembly in this case being part of a wooden roof truss 30 with two different standard configurations respectively in the lefthand half and the righthand half. The division into two halves is denoted by a chain-dotted line 31. The two configurations share a common joist 32 and similarly inclined rafters 33, which together with the joist form an isosceles triangle.

In the lefthand half, bracing of the joist 32 and respective rafter 33 relative to one another is by way of two angled timber struts 34 which include an acute angle with each other and also each include an acute angle with the joist. A shelf support 10, shown in dashed lines, is positioned in a horizontal setting between the two struts 34. The elongate member of the support rests by its upper end edges on the two struts, which pass through the gap between the flanges 18 of the elongate member 11, and transmits all or most of any load directly to the struts and thence to the joist. Securing of the support to each of the struts 34 is by way of the brackets in the manner already described.

In the righthand half of the truss, bracing of the joist 32 and respective rafter 33 relative to one another is by way of a central vertical timber king post 35, only half of the thickness of which is depicted since only half of that thickness is present in the righthand half of the truss, an outlying vertical timber queen post 36 and an intermediate angled timber strut 37 extending from the base of the king post 35 to the top of the queen post 36. A shelf support 10, again shown in dashed lines, is positioned in a horizontal setting between the king post 35 and the strut 37. In this case, the elongate member 11 of the support rests only by its righthand upper end edge on a strut, i.e. the strut 37, and transmits load to the joist via the strut. Securing of the support 10 in the righthand half of the truss 30 to each of the king post 35 and strut 34 is again by way of the brackets, with the bracket at the lefthand end of the elongate member in this case having a load-bearing function.

For the sake of completeness, FIG. 7 also shows in the righthand half of the truss a configuration in which, instead of the king post 35 and a path of the strut 37 to the top of the queen post 36, the strut 37 runs from the apex of the truss to the base of the queen post. This alternative path of the strut 37 is shown in dotted lines, together with a support 10 in the then relevant position.

It is emphasised that the illustrated truss configurations and shelf support positions are merely arbitrarily selected examples of simple and basic designs. The numbers, positions and orientations of posts and struts in a roof construction vary widely, particularly having regard to different truss widths for different roof sizes, and the shelf support can be positioned wherever a shelf is desired to be fitted and adequate space, in conjunction with suitably located posts and/or struts, is available.

Figure 8:
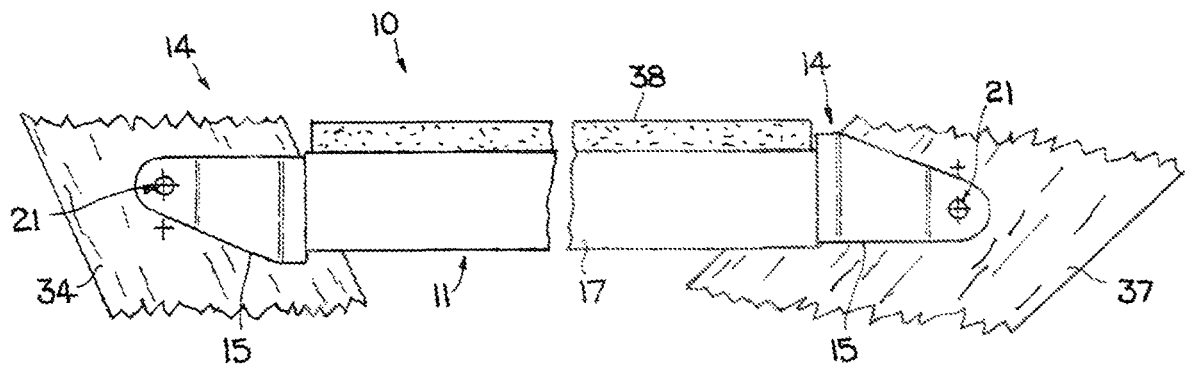
FIG. 8 is a side view of the shelf support of FIG. 1 fitted in a roof truss such as that of FIG. 7 in different ways on the lefthand and righthand sides, together with a shelf supported by the support.

A mounted shelf assembly including the support 10 is shown to enlarged scale in FIG. 8, with the elongate member in broken form to signify a variable length as provided by selection from a range and/or by cutting to length at the time of installation. The lefthand end of the support 10 is shown secured to the lefthand one of the struts 34 of the lefthand half of the roof truss 30 and the righthand end of the support 10 is shown secured to the single strut 34 of the righthand half of the truss 30. The elongate member 11 of the support 10 can be seen to rest by its upper end edges on the struts 34 and 37. The brackets—here the brackets 14—of the support are inserted into the sockets 12 of the member until the abutments 20 abut the end faces 13 of the member at the entrances to the sockets, as a result of which the brackets are pressurably retained in the sockets by spring force and the arms 15 of the brackets form projections embracing the struts. The arms 15 are secured to the struts by wood screws (not shown) inserted through the openings 21 in the arms and screwed into the struts. The openings 21 not visible in FIG. 8 are indicated by centre lines marking the centres of those openings, from which it is evident that each bracket 14 is secured to the respective strut 34 or 37 by screws disposed in vertically offset positions so that the screws do not collide. The mounted shelf assembly is completed by a shelf 38, for example a plank of natural wood or of synthetic wood such as particle board or medium-density fibreboard, resting on the top of the elongate member 11 of the support and similarly shown in broken form to signify a variable width more of less corresponding with the length of the elongate member. Depending on the length of the shelf 38, the installation may require not only supports 10 at or near the ends of the shelf, but also at least one intermediate support 10.

Figure 9:
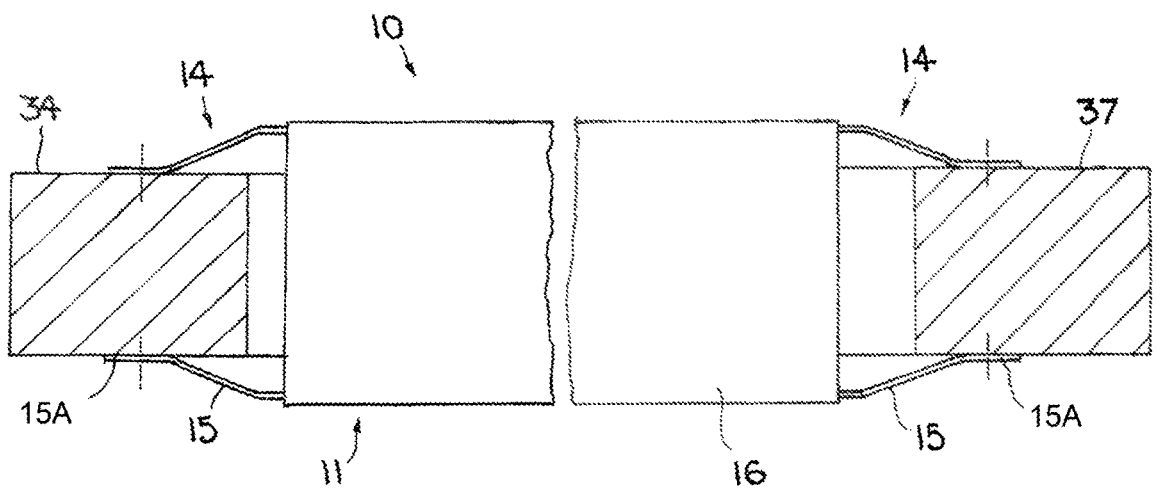
FIG. 9 is a plan view of the fitted shelf support of FIG. 8, but without the shelf.

A plan view of the mounted shelf assembly of FIG. 8, but without the shelf, is shown in FIG. 9 under the same conditions as in FIG. 8. Embracing of the struts 34 and 37 by the projections formed by the arms 15 of the brackets 14 is clearly evident. The relatively thin material of the brackets imparts to the arms a capability of limited resilient deflection to allow adaptation to tolerances in the thickness of the struts, which in general will be constructed from timber of standard dimensions.

A shelf support embodying the present invention provides a simple-to-use and adaptable, load-bearing shelf carrier which makes use, as mounts for the support, of struts, posts or other such structural elements in a space where shelving is to be installed and which eliminates the need for in situ or ad hoc constructions from random materials. As a result, the support 10 may allow significantly more rapid installation of shelving, particularly shelving systems in larger spaces such as lofts or attics.

What is claimed is:

1. A shelf support which is mountable on a mount and comprises:
    an elongate member for supporting a shelf, the elongate member having two mutually opposite ends and defining a respective socket at each of said ends, and
    two mounting brackets each comprising two arms that are spaced-apart, each bracket being insertable into a respective one of the sockets to be positionable therein with the arms projecting away from the elongate member in a length direction thereof so as to provide mutually spaced securing projections for receiving therebetween and thereby embracing a mount on which the support is to be mounted,
    wherein the securing projections are spaced from one another so as to respectively bear at inner surfaces thereof against two opposite outer surfaces of the mount when the mount is received between the projections, wherein the projections are securable to said opposite outer surfaces of said mount when embraced by the projections so as to attach the elongate member to the mount, and wherein each of the arms of each bracket is provided with an opening for reception of a securing device for securing the respective securing projection to the mount;
    wherein the brackets when positioned in the sockets are pressurably engaged to produce a pressurable engagement with the elongate member so as to be retained in the sockets by the pressurable engagement;
    wherein each of the brackets comprises a positioning part which is positionable in a respective one of the sockets and from which the arms of the bracket extend, the positioning part being dimensioned to be an interference fit in the respective socket;
    wherein the positioning part of each bracket is resiliently deflectable to provide the pressurable engagement;
    wherein each of the brackets is U-shaped and the positioning part is formed by a base of the U-shape and by resiliently deflectable adjoining first portions of arms of the U-shape, the arms of the bracket being formed by distal second portions of the arms of the U-shape; and
    wherein said first portions of the arms of the U-shape in an uninserted state of the bracket are splayed apart in a direction away from the base of the U to have a maximum spacing greater than a boundary wall spacing of the respective socket, said first portions of the arms being resiliently bendable to adapt to the boundary wall spacing.

2. The shelf support according to claim 1, wherein each of the brackets is made of folded sheet metal.

3. The shelf support according to claim 1, wherein each of the brackets is made of wire.

4. The shelf support according to claim 1, wherein each of the brackets comprises an abutment for limiting a depth of insertion of each bracket into the respective socket.

5. The shelf support according to claim 4, wherein the abutment of each bracket is formed by a respective abutment adjoining each arm of that bracket and engageable with an end face of an entrance of the respective socket.

6. The shelf support according to claim 5, wherein the abutments of each bracket are engageable with the end face at, respectively, two mutually opposite sides of the entrance.

7. The shelf support according to claim 1, wherein the openings in the arms of each bracket are offset to be non-coaxial, so that securing devices received therein will not be aligned with one another.

8. The shelf support according to claim 1, wherein the elongate member forms a continuous elongate cavity between opposite ends.

9. The shelf support according to claim 1, wherein the elongate member is an inverted U-shaped elongated member in which a base of the U-shaped elongated member is intended to support the shelf and arms of the U-shaped elongated member extend from the base to flanges that extend towards one another, each of the sockets being bounded by the base, the arms and the flanges of said U-shaped cross-section.

10. A mounted shelf assembly comprising:
   a shelf support according to claim 1, the brackets of the shelf support being inserted into and retained in the sockets of the elongate member of the shelf support,
   a respective mount embraced by and secured to the arms of each of the brackets, and
   a shelf supported by the elongate member.

11. The mounted shelf assembly according to claim 10, wherein the mounts are elements of a roof truss.

12. The mounted shelf assembly according to claim 11, wherein the mounts are struts of a roof truss, the struts converging towards one another in a direction away from a crest of the truss, and wherein the elongate member of the shelf support rests on the struts in a level setting.

\* \* \* \* \*